Jan. 9, 1962    E. C. MILLER    3,015,985
METHOD OF OPERATING AN ANALYZER
Original Filed Aug. 20, 1956    3 Sheets-Sheet 1

INVENTOR.
E.C. MILLER
BY Hudson & Young
ATTORNEYS

Jan. 9, 1962   E. C. MILLER   3,015,985
METHOD OF OPERATING AN ANALYZER
Original Filed Aug. 20, 1956   3 Sheets-Sheet 2

INVENTOR.
E.C. MILLER
BY Hudson & Young
ATTORNEYS

Jan. 9, 1962   E. C. MILLER   3,015,985
METHOD OF OPERATING AN ANALYZER
Original Filed Aug. 20, 1956   3 Sheets-Sheet 3

INVENTOR.
E.C. MILLER
BY
Hudson & Young
ATTORNEYS

United States Patent Office 3,015,985
Patented Jan. 9, 1962

3,015,985
METHOD OF OPERATING AN ANALYZER
Elmer C. Miller, Bartlesville, Okla., assignor to Phillips Petroleum Company, a corporation of Delaware
Original application Aug. 20, 1956, Ser. No. 604,991, now Patent No. 2,890,571, dated June 16, 1959. Divided and this application Nov. 12, 1958, Ser. No. 773,371
2 Claims. (Cl. 88—14)

This invention relates to a differential refractometer which is particularly adapted for use in analyzing gaseous streams. In another aspect it relates to apparatus for equalizing fluid pressures between two chambers.

This application is a division of my copending application Serial No. 604,991, filed August 20, 1956, now Patent 2,890,571 issued June 16, 1959.

It is known that ethylene and other low molecular weight unsaturated hydrocarbons can be produced advantageously by the thermal cracking of light saturated hydrocarbons, such as butane. The effluent from such a cracking process comprises vapors which have boiling points over a wide temperature range. One convenient system for separating desired gases, such as ethylene, involves initially removing the $C_4$ and heavier hydrocarbons in an absorption column. The effluent from this column can be fractionated to remove methane and other components which have boiling points lower than the boiling point of methane. The kettle product from this fractionation column can further be fractionated to separate the gaseous mixture into streams of selected constituents.

In accordance with my copending application Serial No. 604,991, there is provided a method for separating a fluid mixture containing methane and other components having higher boiling points into a first stream which is substantially free of methane and a second stream which contains methane and other components in the fluid mixture which have boiling points lower than the boiling point of methane. This separation is accomplished by the use of a fractionation column. The overhead stream removed from the column comprises primarily methane and other constituents having lower boiling points. The kettle product is substantially free of methane. It has been discovered that the refractive index of the fluid mixture in the lower region of the column is indicative of the methane concentration in the mixture. This is surprising because the material in the lower region of the column normally contains a large number of constituents other than methane. The refractive index of a sample stream removed from the lower region of the column is measured to provide a signal which is representative of the methane concentration at this region of the column. This signal is employed to control the operation of the column to maintain the methane concentration in the kettle product within selected limits. The control can be accomplished advantageously by regulating the amount of overhead gases removed from the system.

The refractive index measurement is advantageously made by comparing the refractive index of the sample stream in the gaseous state with the refractive index of a reference gas. It is desirable to maintain the sample stream at a relatively high pressure in order to obtain maximum sensitivity. In accordance with the present invention, a system is provided whereby the pressures of the two gases being compared can be maintained constant and in a preselected ratio. This is accomplished by flowing the two streams continuously through the respective chambers of a refractometer cell to a common vent conduit.

Accordingly, it is an object of this invention to provide a differential refractometer which is particularly adapted to analyze gaseous streams.

Another object is to provide a system for maintaining the pressures of two gaseous streams in a predetermined ratio.

Another object is to provide a method for maintaining the pressures of two gaseous streams in a predetermined ratio.

Other objects, advantages and features of the invention should become apparent from the following detailed description which is taken in conjunction with the accompanying drawing in which.

Figure 1:
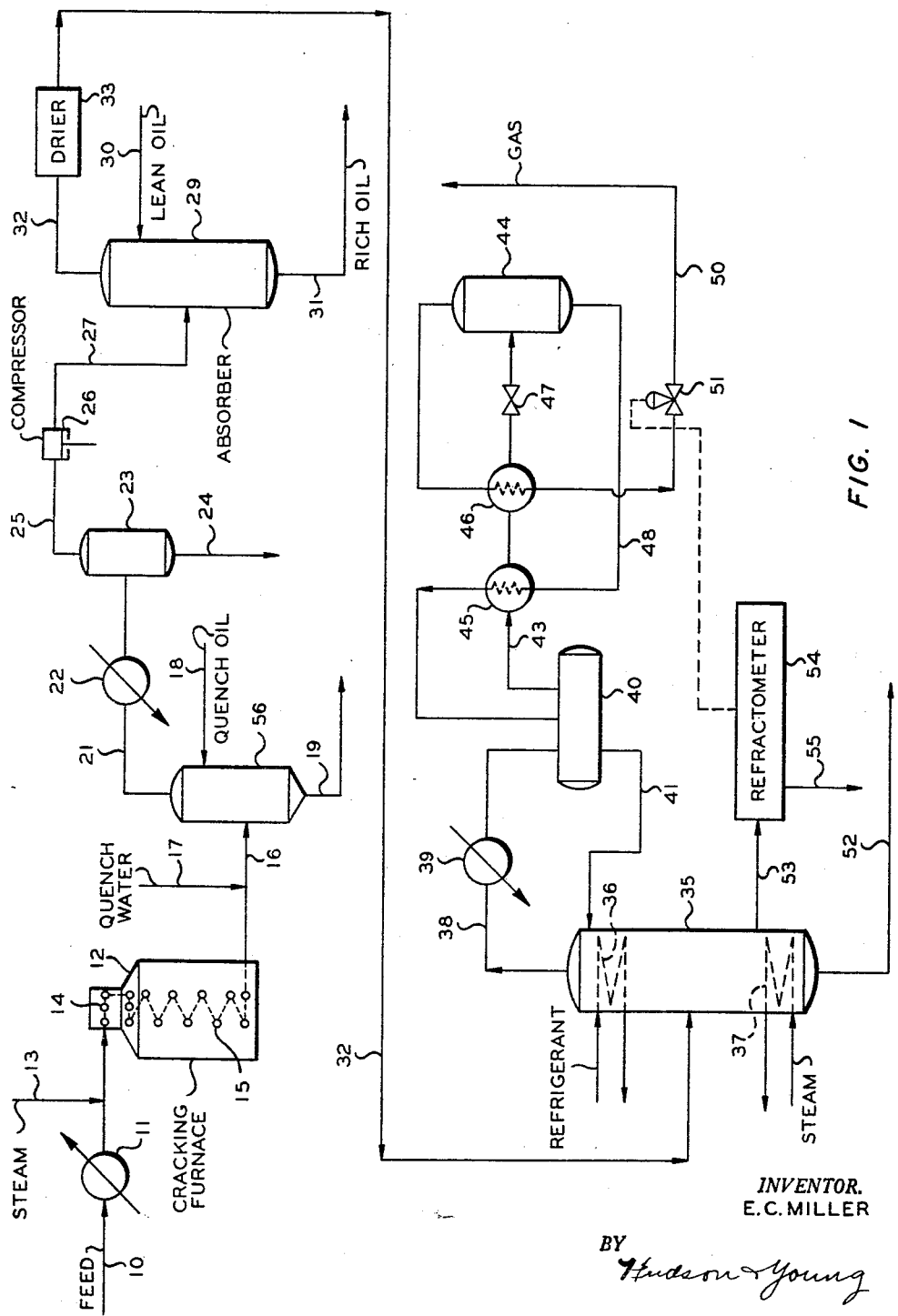
FIGURE 1 is a schematic representation of apparatus which is provided to crack hydrocarbons and separate the effluent vapors.

Referring now to the drawing in detail and to FIGURE 1 in particular, a hydrocarbon feed stream to be cracked is supplied by a conduit 10 which communicates through a vaporizer 11 with the inlet of a cracking furnace 12. A diluent, such as steam, is added to conduit 10 by means of a conduit 13. Furnace 12 has an elongated pipe 14 in the upper portion thereof which communicates with a second elongated pipe 15 in the lower portion. Heat is supplied to these pipes by a plurality of burners which are mounted in the side walls of the furnace. Pipe 15 communicates with an outlet conduit 16. Water is added to conduit 16 by means of a conduit 17 in order to quench the furnace effluent. Conduit 16 communicates with the inlet of a quench drum 56. A cool oil is sprayed into drum 56 by means of an inlet conduit 18 to cool further the furnace effluent. The heated oil is removed from the bottom of drum 56 through an outlet conduit 19, cooled, and subsequently recycled to drum 56. Vapors from drum 56 are directed through a conduit 21 and a cooler 22 to a knock-out drum 23. Any condensed material is removed from drum 23 through a conduit 24. Vapors are removed from drum 23 through a conduit 25 which communicates with the inlet of a compressor 26. The outlet of compressor 26 is connected by means of a conduit 27 to the inlet of an absorber 29.

A lean oil is supplied to the upper region of absorber 29 by means of a conduit 30. The rich oil is removed from absorber 29 through a conduit 31. Absorber 29 normally is operated so that substantially all of the $C_4$ and heavier hydrocarbons are absorbed by the oil and removed through conduit 31. The effluent gases from absorber 29 are removed through a conduit 32 which has a drier 33 therein. Conduit 32 communicates at a second end with the inlet of a fractionation column 35 which is employed to remove methane and lighter gases from the gaseous effluent from absorber 29.

Column 35 is provided with a cooling coil 36 in the upper region and a heating coil 37 in the lower region. These coils provide the desired temperature differential to accomplish the separation of the fluid mixture. Vapors are removed from the top of column 35 through a conduit 38 which communicates through a condenser 39 with a reflux accumulator 40. The condensed liquid is directed from accumulator 40 back to column 35 through a reflux conduit 41. The vapor in accumulator 40 is removed through a conduit 43 which communicates with a liquid-vapor separator 44 through heat exchangers 45 and 46 and a pressure reducing valve 47. Condensed vapors are returned from separator 44 to accumulator 40 through a conduit 48 which passes through heat exchanger 45. Cooled vapors from separator 44 are removed through an outlet conduit 50 which passes through heat exchanger 46. A control valve 51 is provided in conduit 50 to permit the amount of effluent gas withdrawn to be regulated.

A kettle product is removed from column 35 through an outlet conduit 52. A conduit 53 communicates between a lower region of column 35 and the inlet of a refractometer 54 in order to provide a sample stream to the refractometer. This sample is vented through a conduit 55. Refractometer 54 provides an output signal which is representative of the refractive index of the sample stream removed from column 35. This signal contols valve 51 in the manner described in detail hereinafter to regulate the operation of the column so that the desired fluid separation is maintained.

Figure 2:
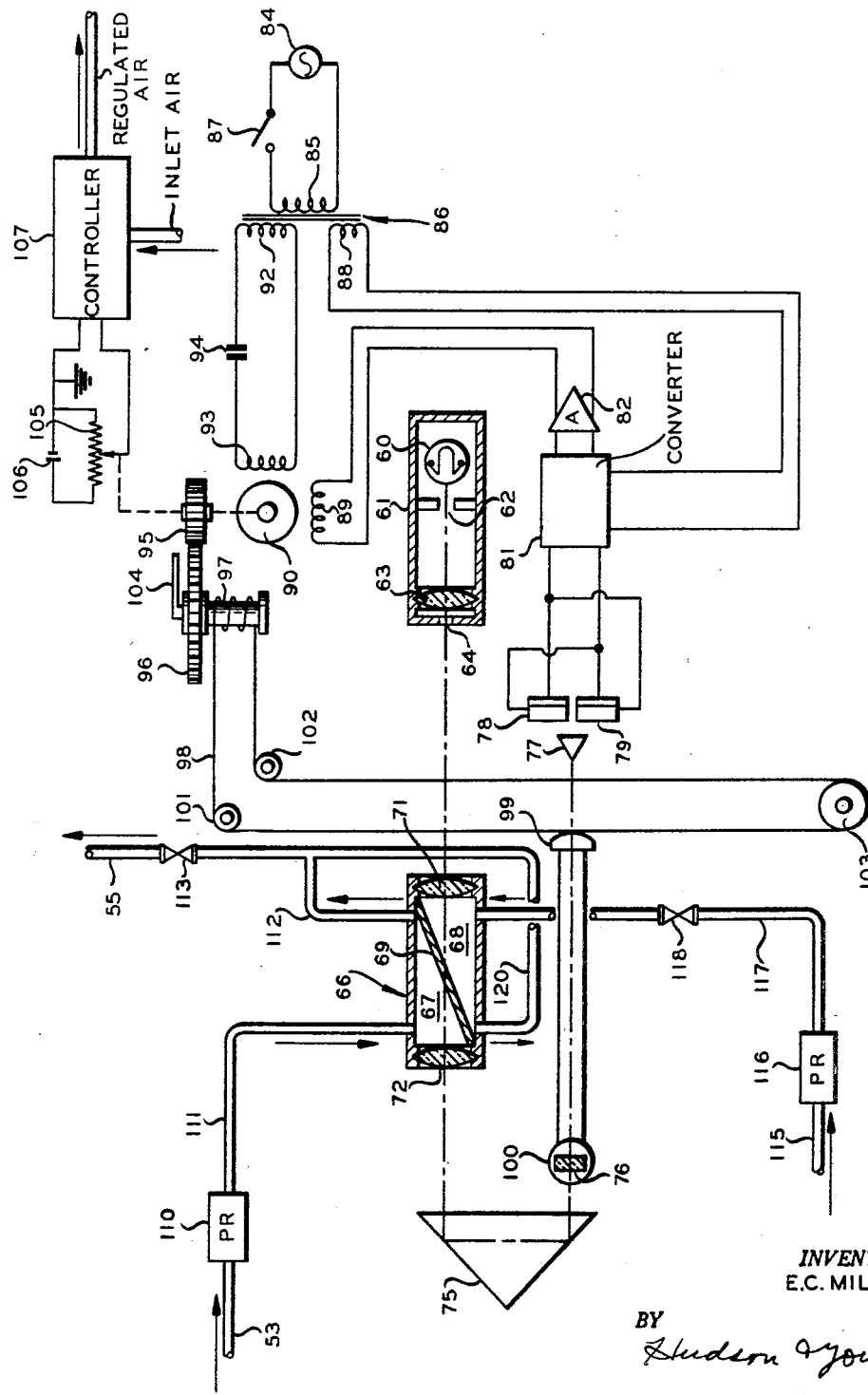
FIGURE 2 is a schematic drawing of a differential refractometer, having the pressure control system of this invention incorporated therein, which can be employed to control the operation of the fractionation column of FIGURE 1.

A suitable instrument which can be employed to measure the refractive index of the sample stream is illustrated in FIGURE 2. This instrument comprises a source of light 60 which is mounted in a housing 61. Source 60 can be an ordinary incandescent bulb which emits radiation in the visible spectrum. A portion of the light emitted from source 60 passes through a first aperture 62 and a converging lens 63. A narrow beam of this light emerges from housing 61 through a second aperture 64. This light beam is directed through a refractometer cell assembly 66. The purpose of aperture 62 is to reduce the total radiation transmitted from light source 60 in order to minimize heating of the cell assembly. The filament of source 60 is located slightly beyond the focal point of lens 63 which in turn is positioned in close proximity to aperture 64.

Cell assembly 66 comprises first and second chambers 67 and 68 which are separated by a plate 69 of radiation transparent material. Plate 69 is disposed at an angle other than 90° with respect to the axis of the beam of radiation transmitted through a cell assembly. A converging lens 71 comprises the inlet window of chamber 68 and a converging lens 72 comprises the outlet window of chamber 67. The components thus far described are arranged such that aperture 64 is at the effective principal focus of lens 71. This results in a parallel beam of light being transmitted through the cell assembly.

The light beam emerging from lens 72 enters a glass prism 75 which is positioned such that its front surface is substantially perpendicular to the light beam. The light is twice reflected within prism 75 and emerges in a direction so as to pass through a rotatable glass block 76. The light beam then strikes the apex of a second prism 77. A radiation detecting unit which comprises photovoltaic cells 78 and 79 is positioned so that a light beam striking the apex of prism 77 is divided into two beams of equal magnitude which impinge upon the two cells. The output voltages of cells 78 and 79 are connected in opposition to one another to the input terminals of a converter 81. The differential output signal from the two cells is thus converted into a corresponding alternating signal which is applied to the input terminals of an amplifier 82. Converter 81 is energized from a source of alternating current 84 which is applied across the primary winding 85 of a transformer 86 through a switch 87. The first secondary winding 88 of transformer 86 is connected to converter 81 so that the frequency of the signal applied to amplifier 82 is the same as that of current source 84. The output signal of amplifier 82 is applied to the first winding 89 of a reversible two phase induction motor 90. A second secondary winding 92 of transformer 86 is connected across the second motor winding 93 through a capacitor 94. This results in the two signals applied to the motor windings being either 90° or 270° out of phase with one another depending upon the polarity of the input signal applied to converter 81. Converter 81, amplifier 82 and motor 90 can be of the type described in "The Electronic Control Handbook," Batcher and Moulic, Caldwell-Clements, Inc., New York, 1946, pages 298 to 300, for example.

The drive shaft of motor 90 is connected through gears 95 and 96 to a drum 97. A wire 98 is attached to a rocker arm 99 which is connected to the base 100 upon which block 76 rotates. Wire 98 extends from rocker arm 99 about guide wheels 101, 102, and 103 and drum 97. Rotation of drum 97 thus results in block 76 being rotated about its pivot point. The drive shaft of motor 90 is also connected to the contactor of a telemetering potentiometer 105. A voltage source 106 is connected across the end terminals of potentiometer 105. The contactor and one end terminal of potentiometer 105 are connected to the input terminals of a controller 107. Controller 107 can be a conventional instrument which provides a regulated output air pressure which is a function of an input electrical signal. This output air pressure can be employed to actuate valve 51 of FIGURE 1.

The sample stream removed from column 35 of FIGURE 1 is directed through conduit 53 which communicates with the inlet of a pressure regulator 110. The outlet of pressure regulator 110 is connected by a conduit 111 to the inlet of chamber 67. The outlet of chamber 67 is connected by a conduit 112 to the inlet of a valve 113. The outlet of valve 113 is connected to vent conduit 55. A reference fluid is supplied by a conduit 115 which communicates with the inlet of a pressure regulator 116. The outlet of pressure regulator 116 is connected by a conduit 117, which has a valve 118 therein, to the inlet of chamber 68. The outlet of chamber 68 is connected by a conduit 120 to the inlet of valve 113.

The refractive index measurement is made by comparing the refractive index of the sample stream with the refractive index of a reference fluid. Both of these fluids are maintained in the gaseous state. It is desirable that the sample gas be maintained at a relatively high pressure to provide greater sensitivity. A pressure of approximately 300 pounds per square inch can be employed to advantage, for example. Pressure regulator 110 thus maintains the sample stream circulated through chamber 67 at this pressure. The reference fluid in chamber 68 can be a portion of the final ethylene product from the separation system. This material is applied to valve 118 at a constant pressure of approximately 315 pounds per inch, for example, by pressure regulator 116. This results in a constant pressure differential across valve 118. Pressure regulator 116 and valve 118 thus function as a flow regulator. If the flow through valve 113 is greater than the flow through valve 118 and chamber 68, there is a flow through chamber 67. Flow control system 110 and 113 must be set to flow a sample rate larger than through chamber 68. The material in chamber 68 can remain stationary, however.

If the refractive index of the fluid in chamber 67 is the same as the refractive index of the fluid in chamber 68, the light beam emerging from cell assembly 66 is parallel to the light beam which enters the cell assembly. Any change in refractive index of the sample fluid results in a deviation of the direction of the emerging light beam. The servo system operates so that the light beam impinges upon the apex of prism 77. This results in equal output voltages being provided by cells 78 and 79 so that the differential output voltage is zero. Motor 90 thus remains stationary. If the light beam should deviate in either direction, one of the photovoltaic cells receives a greater amount of radiation than the other. The results in an output signal which drives motor 90 to rotate drum 97. The direction of rotation is such as to rotate block 76 in a direction to move the light beam back to the apex of prism 77. The amount of motor rotation is thus representative of changes in the refractive index of the sample fluid. This rotation is applied as a corresponding electrical signal to the input of controller 107.

As a specific example of the operation of the thermal cracking process, a feed stream of normal butane is introduced into furnace 12 through conduit 10. For each one thousand mols of feed gas, 249 mols of water in the form of steam are added through conduit 13. The resulting mixture is introduced into furance 12 at a temperature of approximately 150° F. and at a pressure of approximately 85 pounds per square inch absolute (p.s.i.a.). The residence time of the mixture in pipe 14 is approximately 7 seconds and the residence time in pipe 15 is approximately 4 seconds. The gases are heated in pipe 14 to a temperature of approximately 1000° F. and are further heated in pipe 15 to a temperature of approximately 1500° F. The effluent gases leave furnace 12 at a temperature of approximately 1000° F. and at a pressure of approximately 20 p.s.i.a. The effluent from furnace 12 has a composition approximately as follows:

| Material: | Mols per 1000 mols feed gas |
|---|---|
| Hydrogen | 200 |
| Methane | 830 |
| Acetylene | 10 |
| Ethylene | 640 |
| Ethane | 130 |
| Propylene | 250 |
| Propane | 12 |
| Butadiene | 20 |
| Butylene | 25 |
| Normal butane | 42 |
| Benzene | 48 |
| Water | 249 |
| Other compounds | 43 |

Absorber 29 is operated so that nearly all of the $C_3$ and lighter constituents are removed overhead and nearly all of the $C_4$ and heavier constituents are absorbed by the oil. The composition of the fluid mixture in the lower region of column 35 is approximately as follows:

| | Theoretical Trays (22 Total) | | | | | | | |
|---|---|---|---|---|---|---|---|---|
| | Kettle | 1 | 2 | 3 | 4 | 5 | 6 | 7 |
| Methane | 0.42 | 1.06 | 2.37 | 4.94 | 9.79 | 18.11 | 30.40 | 44.9 |
| Ethylene | 75.37 | 79.54 | 80.11 | 78.61 | 74.82 | 67.97 | 57.72 | 45.6 |
| Ethane | 18.12 | 15.81 | 14.43 | 13.53 | 12.63 | 11.44 | 9.78 | 7.85 |
| Propylene | 5.60 | 3.33 | 2.87 | 2.71 | 2.55 | 2.31 | 1.95 | 1.52 |
| Propane | 0.28 | 0.16 | 0.14 | 0.13 | 0.12 | 0.11 | 0.09 | 0.07 |
| Butenes | 0.18 | 0.08 | 0.07 | 0.07 | 0.07 | 0.06 | 0.05 | 0.03 |
| Benzene | 0.14 | 0.006 | | | | | | |

Figure 4:
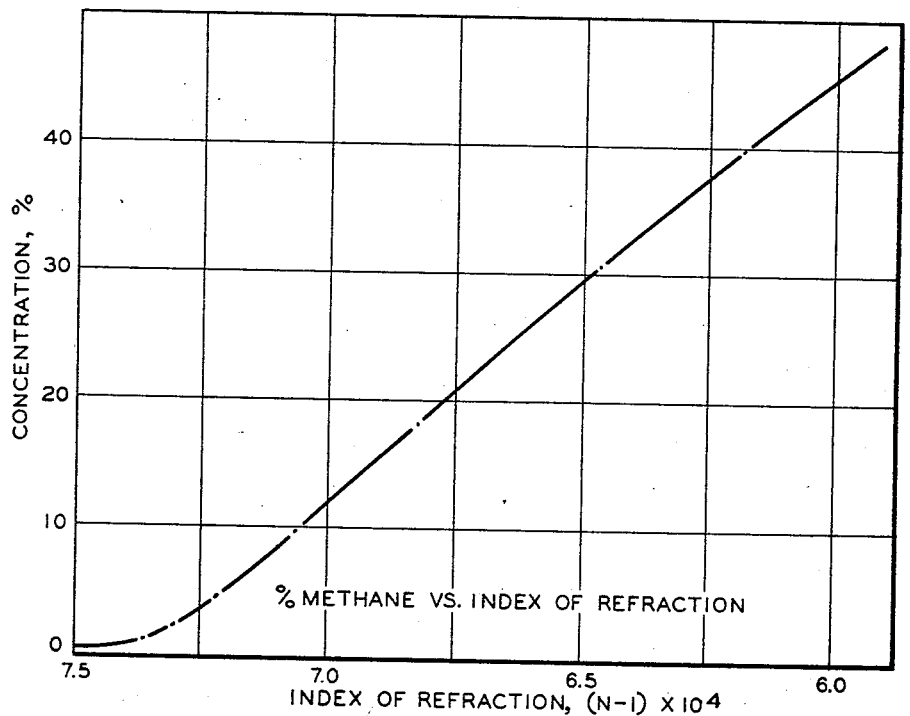
FIGURE 4 is a graphical representation of the concentration of methane as a function of the refractive index of the fluid mixture in the lower portion of the fractionation column of FIGURE 1.
Figure 3:
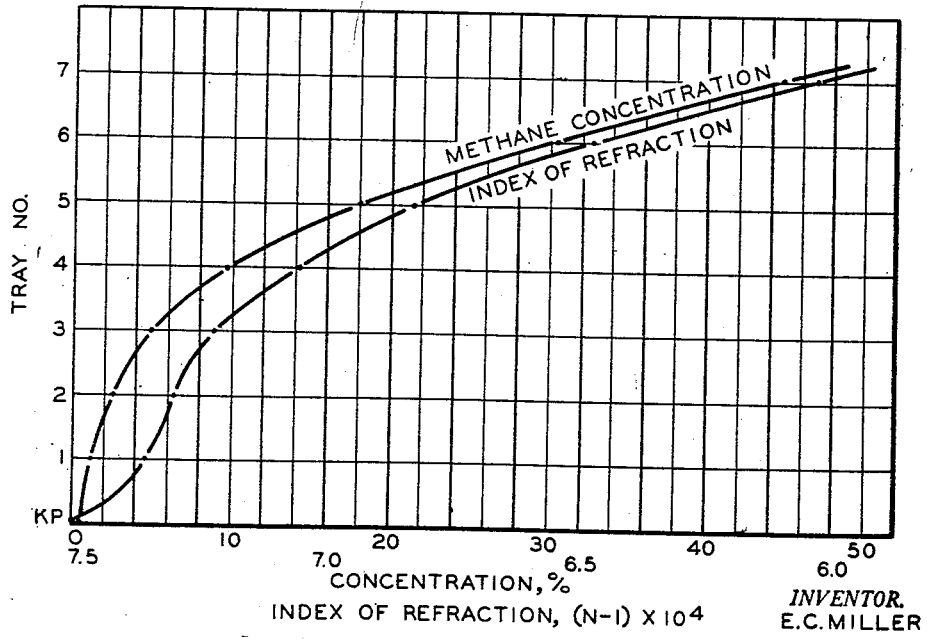
FIGURE 3 is a graphical representation of the concentration and index of refraction of materials in the lower region of the fractionation column of FIGURE 1.

In FIGURE 3 the index of refraction of the fluid mixture at these several trays is plotted against tray number. The methane concentration at the same trays is also plotted. It can be seen that the two curves have substantially the same shape. Thus, the refractive index of the mixture is representative of the methane content in the lower region of the column. A measurement of refractive index of a sample withdrawn from a lower tray, actual tray two to six, for example, is thus indicative of the methane concentration. FIGURE 4 shows the methane concentration varies almost linearly with the refractive index of the mixture. If the measured refractive index decreases, for example, the methane concentration is increased. Valve 51 is then opended further to permit a greater withdrawal of overhead gas. Conversely, valve 51 is closed further if the measured refractive index increases.

Interferences which might be expected are not objectionable because of the relatively large change in methane concentration per tray. For example, at 10 percent methane, a variation as much as 80 percent in the ethylene-ethane ratio is indicated as only a one percent change in methane concentration. The heavier components are present in very small quantities so that changes in concentration thereof are relatively unimportant.

While the invention has been described in conjunction with present preferred embodiments, it obviously is not limited thereto.

What is claimed is:

1. A method of operating two zones adapted to transmit light through a fluid in each of said zones, which comprises flowing a first fluid through a first pressure regulation zone, regulating the pressure of said first fluid and discharging said first fluid from said first reguation zone at a predetermined pressure, then flowing said first fluid into a first light transmitting zone, flowing said fluid from said first zone into a common zone and from said common zone, regulating flow of total fluid from said common zone, flowing a second fluid through a second pressure regulation zone, regulating the pressure of said second fluid, and discharging said second fluid from said second pressure regulation zone at a predetermined pressure, then flowing said second fluid into a second light transmitting zone, flowing said second fluid from said second light transmitting zone into said common zone into admixture therein with said first fluid, and regulating the flow of said second fluid from said second regulating zone into said second zone and the flow of the combined fluids from said common zone so that there is effected a flow of fluid through at least one of said first and said second light transmitting zones.

2. A method according to claim 1 wherein in one of the light transmitting zones, there is contained a fluid to be analyzed and in the other light transmitting zone, there is contained a reference fluid, light is transmitter through said fluids and variations in the transmitted light are employed to regulate an operation resulting in said fluid to be analyzed.

References Cited in the file of this patent

UNITED STATES PATENTS

| 1,231,293 | Peters | June 26, 1917 |
| 2,270,304 | Jacobsson | Jan. 20, 1942 |
| 2,724,304 | Crawford | Nov. 22, 1955 |
| 2,787,281 | Word | Apr. 2, 1957 |
| 2,868,216 | Robertson | Jan. 13, 1959 |
| 2,885,922 | Miller | May 12, 1959 |